Dec. 30, 1952   C. E. HELWIG   2,623,319
ARTIFICIAL FISH LURE
Filed Dec. 27, 1945
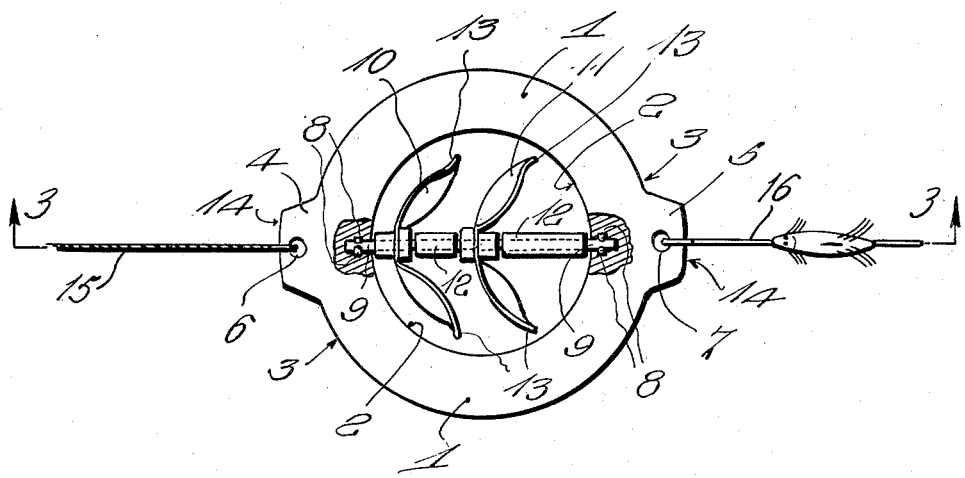
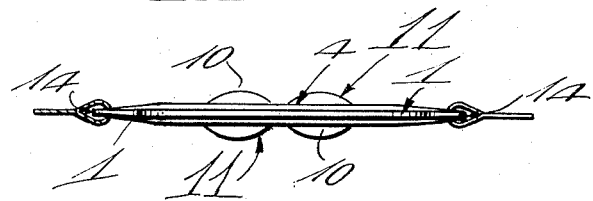
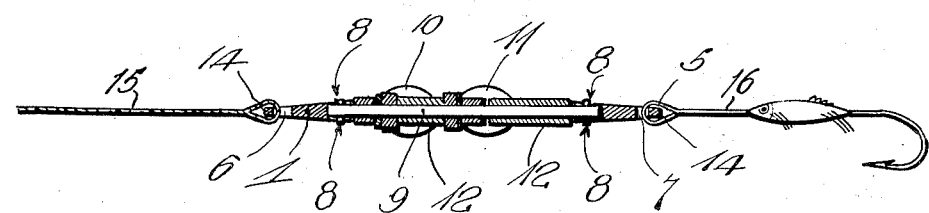
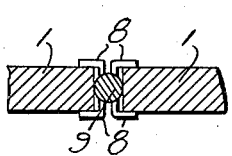
Inventor
CLARENCE ELBERT HELWIG,
By
Attorney Patented Dec. 30, 1952

2,623,319

UNITED STATES PATENT OFFICE 2,623,319

ARTIFICIAL FISH LURE

Clarence Elbert Helwig, Geneva, Ohio

Application December 27, 1945, Serial No. 637,365

1 Claim. (Cl. 43—42.12)

This invention is directed to a lure, particularly of the trolling or casting type and designed to remain for luring purposes on the surface of the water.

The primary object of the invention is the provision of a lure of this type which may be constructed of metal or plastic, particularly designed for surface movement during use, and constructed of an annular body with spinners in the open center of the body, with the spinners rotating horizontally in the same direction and assisting in maintaining the flotation of the body in use.

A further object of the invention is to provide the body with a varying thickness, the annular rim of the body tapering gradually from the inner margin, where it is of greatest thickness, to the outer margin, to hold the body more stable in use.

The invention is illustrated in the accompanying drawings, in which:

Fig. 1 is a plan view of the lure with parts being broken away in section.

Fig. 2 is an edge view of the lure.

Fig. 3 is a sectional view on the line 3—3 of Fig. 1 on the plane indicated by the line 3—3 of Figure 1.

Fig. 4 is a detail sectional view transversely to the shaft 9 and in the plane of the ears 8.

The improved lure comprises a body of annular form, as at 1, the body being formed with a central opening 2 which is of less area than the flat areas beyond the inner opening. The body, as at 3, is formed at diametrically opposite points with integral extensions 4 and 5. These extensions are formed with holes 6 and 7, for connection respectively of the pole line 18 and bait.

On a diameter passing centrally through the extensions 4 and 5, the body is formed with recesses in which are inserted the extremities of a shaft 9, these extremities being provided with pliable ears on opposite sides which are built over against the opposite faces of the body, as clearly shown in Fig. 4. This shaft supports spinners 10 and 11, separated by spacers 12 and independently rotatable on the shaft 9. The blades 13 of the spinners incline rearwardly with respect to the direction of travel of the lure in use and present an overall length slightly less than the diameter of the opening 2.

The annular body 1 of the lure is of maximum desired thickness at the inner margin and converges therefrom to a relatively thin edge 14, to present a substantially wedge-shaped lure transversely, as best shown in Fig. 3.

The lure is a floating lure, working on the surface of the water in use, and is more particularly designed for casting and trolling uses. The projections 4 and 5 prevent the bait from tilting back, or forward while the holes 6 and 7, permit the passage of enough water to keep the body from rocking due to wave movement.

The spinners rotate about a horizontal axis in the body and materially assist in keeping the lure on the surface of the water. All described details operate to balance the effect of the water on the respective surfaces of the lure and insure that the water pressure will not cause the lure to turn or twist but will remain substantially flat on the surface of the water in all fishing operations.

Having thus described the invention, what is claimed as new, is:

A fishing lure including a circular body formed with a central opening and defining a rim tapering throughout its width to a thin margin at the outer edge, a shaft supported on one surface of the body and bridging the central opening, extensions projecting from the body, each extension being formed with an opening one to receive the pole line and the other, the bait line, with said extension openings affording free passage of water through them when the lines are connected, and independent spinners supported on the shaft for movement in the same direction in the operation of the lure, the overall length of each spinner being slightly less than the diameter of said central opening.

CLARENCE ELBERT HELWIG.

REFERENCES CITED

The following references are of record in the file of this patent:

UNITED STATES PATENTS

| Number | Name | Date |
|---|---|---|
| 576,680 | Kittle | Feb. 6, 1897 |
| 1,503,901 | Jones | Aug. 5, 1924 |
| 1,946,979 | Liotta | Feb. 13, 1934 |